(12) United States Patent
Broome et al.

(10) Patent No.: US 10,486,377 B2
(45) Date of Patent: Nov. 26, 2019

(54) METHOD OF MOULDING A COMPOSITE ARTICLE AND MOULD

(71) Applicant: Blade Dynamics Limited, Southhampton, Hampshire (GB)

(72) Inventors: Peter Anthony Broome, Park Ridge, IL (US); Paul Trevor Hayden, Southampton (GB)

(73) Assignee: Blade Dynamics Limited, Southhampton, Hampshire (GB)

( * ) Notice: Subject to any disclaimer, the term of this patent is extended or adjusted under 35 U.S.C. 154(b) by 333 days.

(21) Appl. No.: 15/207,738

(22) Filed: Jul. 12, 2016

(65) Prior Publication Data
US 2017/0021578 A1 Jan. 26, 2017

(30) Foreign Application Priority Data
Jul. 20, 2015 (GB) .................................. 1512690.7

(51) Int. Cl.
*B29C 70/54* (2006.01)
*B29C 70/48* (2006.01)
*B29C 70/44* (2006.01)
*B29C 33/42* (2006.01)

(52) U.S. Cl.
CPC ............ *B29C 70/548* (2013.01); *B29C 70/48* (2013.01); *B29C 70/446* (2013.01); *B29C 2033/422* (2013.01)

(58) Field of Classification Search
None
See application file for complete search history.

(56) References Cited

U.S. PATENT DOCUMENTS

| 5,052,906 A | 10/1991 | Seemann |
| 2001/0009313 A1* | 7/2001 | McClure ............... B29C 70/443 264/316 |
| 2002/0146529 A1 | 10/2002 | Lang et al. |

(Continued)

FOREIGN PATENT DOCUMENTS

| DE | 102014209400 A1 | 11/2015 |
| EP | 2565020 A2 | 3/2013 |

(Continued)

OTHER PUBLICATIONS

European Search Report and Opinion issued in connection with corresponding EP Application No. 16179563.8 dated Jan. 5, 2017.

(Continued)

*Primary Examiner* — Monica A Huson
(74) *Attorney, Agent, or Firm* — Dority & Manning, P.A.

(57) ABSTRACT

The present invention relates to a method of moulding a composite article using a mould. The mould includes first and second rigid mould parts between them defining a mould cavity. A reservoir of resin is connected to an inlet into the mould cavity. A suction pump is connected to a port on the opposite side of the mould cavity from the inlet. At least one of the mould parts has an arrangement of grooves on the surface facing the mould cavity to distribute resin across the mould cavity. The method includes laying up fibres in the mould cavity, injecting resin from the reservoir by running the suction pump to fill the mould cavity with resin, curing the resin article to form a moulded article and opening the mould and removing the article.

8 Claims, 2 Drawing Sheets

(56) References Cited

U.S. PATENT DOCUMENTS

| | | |
|---|---|---|
| 2008/0044506 A1 | 2/2008 | Zahlen et al. |
| 2010/0196637 A1* | 8/2010 | Lippert ................. B29C 70/345 428/36.1 |
| 2011/0192531 A1 | 8/2011 | Sekido et al. |
| 2013/0099429 A1 | 4/2013 | Filsinger et al. |

FOREIGN PATENT DOCUMENTS

| | | |
|---|---|---|
| GB | 1024582 A | 3/1966 |
| WO | 0006360 A1 | 2/2000 |
| WO | 2005000566 A1 | 1/2005 |
| WO | 2015058775 A1 | 4/2015 |

OTHER PUBLICATIONS

GB Search Report and Written Opinion issued in connection with corresponding GB Application No. 1512690.7 dated Jan. 4, 2016.

* cited by examiner

METHOD OF MOULDING A COMPOSITE ARTICLE AND MOULD

BACKGROUND

The present invention relates to a method of moulding a composite article and mould.

There are a variety of composite manufacturing processes which each have advantages and disadvantages. The factors which drive selection of the process include structural quality of the part, cost, surface finish, production rate, volume and limitations of the method. Common composite manufacturing methods are hand lay-up, pre-preg lay-up, bag moulding, autoclave processing, compression moulding, resin transfer moulding, pultrusion and filament winding. The two methods that are most appropriate for comparison to the invention are both resin transfer moulding (RTM) processes. The two methods are conventional RTM and vacuum assisted RTM (VARTM).

Resin transfer moulding (RTM) involves using a closed mould with two rigid surfaces. Fibre reinforcement is placed in the mould which is then closed. Liquid resin is then injected into the mould to wet out the reinforcement and fill the mould cavity. The resin supply is then removed and heat is applied to cure the composite part. By using a mould with two rigid surfaces, a high quality finish of both sides of the moulded article is achieved. This process can produce large, complicated shapes and relatively short cycle times. However, this remains a relatively expensive process as the cost of the equipment to inject the resin under high pressure is high as is the cost of the tooling which can safely contain such pressure.

Vacuum assisted resin transfer moulding (VARTM) involves the application of a vacuum to draw resin into the mould. As the resin is infused via a vacuum, half of the mould can be replaced by a vacuum bag. The pressure differential is much lower than in conventional RTM so the cost of the mould can be lower. For example, heavy steel moulds can be replaced by lightweight moulds. The VARTM process can produce one high quality surface against the rigid mould surface. However, the opposite surface which is produced by the surface of the vacuum bag cannot be precisely defined given the distortions of the vacuum bag particularly in the vicinity of any well-defined corners. This process also requires a relatively large number of consumable parts including the vacuum bag, the distribution mesh and the sealant tape required to seal the edge of the vacuum bag.

BRIEF DESCRIPTION

According to a first aspect of the present invention there is provided a method of moulding a composite article using a mould. The method includes the steps of laying up fibres in a mould cavity, wherein the mould cavity is defined by a first rigid mould part and a second rigid mould part. At least one of the mould parts has an arrangement of grooves on the surface facing the mould cavity to distribute resin across the mould cavity. The method further includes injecting resin from a reservoir of resin, wherein the reservoir of resin is connected to an inlet into the mould cavity, by running a suction pump to fill the mould cavity with resin, wherein the suction pump is connected to a port on the opposite side of the mould cavity from the inlet; curing a resin article to form a moulded article; opening the mould; and removing the article.

The presence of the grooves means that the flow resistance across the mould cavity from the point of injection is greatly reduced. Typically, the pressure difference between the inside and outside of the mould is less than 1 bar (100 kPa). This allows the equipment to be operated at a much reduced pressure. In fact, it is possible to rely on the suction pump alone thereby eliminating, or at least greatly simplifying, the use of costly pressure pumps and systems traditionally used in the prior art. It also allows the use of smaller mould parts with an associated cost saving and ease of handling.

The reduction in flow resistance means that more complex continuous fibre material can be used and it also allows a significant increase in the Fibre Volume Fraction (FVF). This is the proportion of the composite material by volume which is occupied by fibre rather than matrix material. The invention can even operate with 100% woven materials to produce structural components with high FVF.

The use of two rigid mould parts also provides superior dimensional accuracy, and stable and repeatable cured ply thickness can be achieved.

The improved surface also leads to a very low scrap rate, the part emerging from the mould requiring minimal trimming and rework.

Further, the consumable parts of the process are greatly reduced as the rigid mould parts can be reused unlike in the prior art process where the vacuum bag, distribution mesh and sealing tape are all consumable components. Initial estimates put the reduction of consumables at about 85%.

The above method can produce an article with two high quality surfaces each formed by a rigid mould part. At least one of these surfaces will have an arrangement of ribs corresponding to the arrangement of grooves. This may be acceptable for certain components, for example if the ribs are on an internal face of the article. If, however, an article without ribs is required, the method further includes the steps of placing a peel-ply layer between the fibres and the grooves on the adjacent surface of the mould; and, after removing the article, peeling the peel-ply layer to remove a layer of resin formed in the grooves from the remainder of the moulded article. With such an arrangement, all of the above-mentioned advantages concerning the accuracy of the moulding with two rigid mould parts and retained. There is a slight decrease in the surface quality of the surface formed after the peel-ply layer has been removed. However, even with the peel-ply layer, the method is far more controllable and repeatable than using a flexible mould surface.

The arrangement of grooves may be provided on one mould cavity only. However, better resin distribution is provided if the arrangement of grooves is provided on both mould parts. There may be a peel-ply layer associated with only one of the mould parts and the resulting ridges can be left on one side of the moulded article. Alternatively, there may be a peel-ply layer associated with each respective mould surface.

The arrangement of grooves may be placed in trimmed or discarded areas, thus producing a higher class 'A' surface on the final composite article.

The arrangement of grooves may take any form which will successfully distribute the resin across the mould cavity. In one configuration, there are a number of primary grooves which extend in a direction generally away from the resin inlet towards the opposite side and a number of smaller secondary grooves which distribute the resin from the primary grooves.

BRIEF DESCRIPTION OF THE DRAWINGS

An example of a method in accordance with embodiments the present invention will now be described with reference to the accompanying drawings, in which.

DETAILED DESCRIPTION

Figure 1:
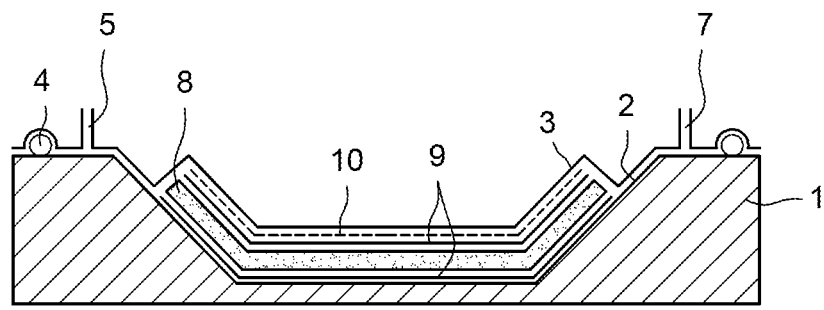
FIG. 1 is a schematic cross-section of a prior art vacuum assisted resin transfer moulding process.

FIG. 1 is a schematic depiction of a vacuum assisted resin transfer moulding (VARTM) process. There is a single rigid mould tool 1 which has a first surface 2 forming a high quality mould surface.

The opposite side of the mould is created by a vacuum bag 3 which is a flexible membrane that is drawn into the required position by application of a vacuum. Thus, the mould cavity is created between the mould surface 2 and the vacuum bag 3. The mould cavity is sealed by a seal 4 between the vacuum bag 3 and mould tool 1. Resin is supplied along a resin inlet 5 by a high pressure pump. A vacuum pump provides suction at vacuum outlet 7 to draw resin across from the opposite side of the mould cavity.

In use, fibres 8 and peel-ply layer 9 are first laid up in the mould. A distribution media layer 10 is then placed on the stack to aid the flow of resin. The vacuum bag 3 is put in place and a vacuum is applied. Resin is then drawn through the mould cavity by the vacuum pump to wet-out the full mould cavity. The resin and fibre are then cured together, before the vacuum bag 3 is released and the moulded article removed. The peel-ply layer 9 is then removed. This exposes a surface which has a better quality finish than the surface moulded directly by the vacuum bag 3. However, particularly in corner regions or regions with complex geometry in the mould cavity which are in the vicinity of the vacuum bag, the flexibility of the vacuum bag causes distortion in the shape of the mould cavity which also affects the accurate placing of the peel-ply layer 9.

The flexibility of the vacuum bag also contributes to variability in the port thickness.

Figure 2:
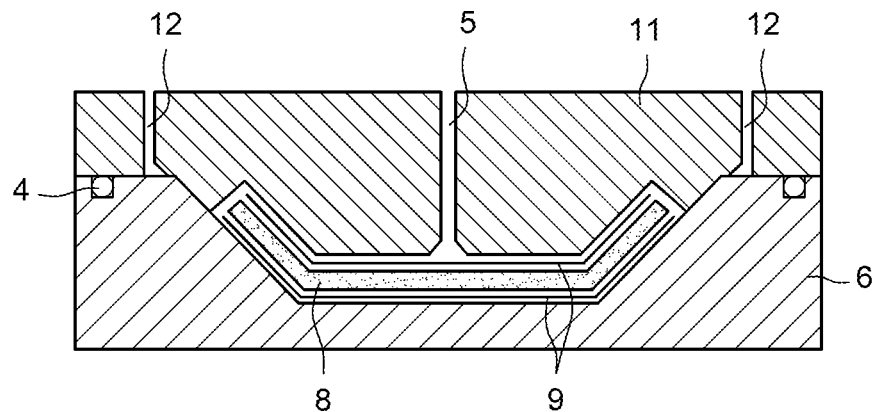
FIG. 2 is a schematic cross-section of a prior art resin transfer moulding process.

FIG. 2 is a similar view showing a resin transfer moulding (RTM) process. Similar components have been designated with the same reference numeral.

In this case the vacuum bag 3 of the previous example has been replaced by a second rigid mould tool 11. Resin is again introduced along resin inlet 5, but this time there is no vacuum pump. Instead, there are a number of vents 12 to allow the resin to flow throughout the mould. Whilst this arrangement is more accurate than the vacuum assisted arrangement above, it is significantly more expensive in that it requires a second high pressure rigid mould tool 11 and a higher pressure pump.

Figure 3:
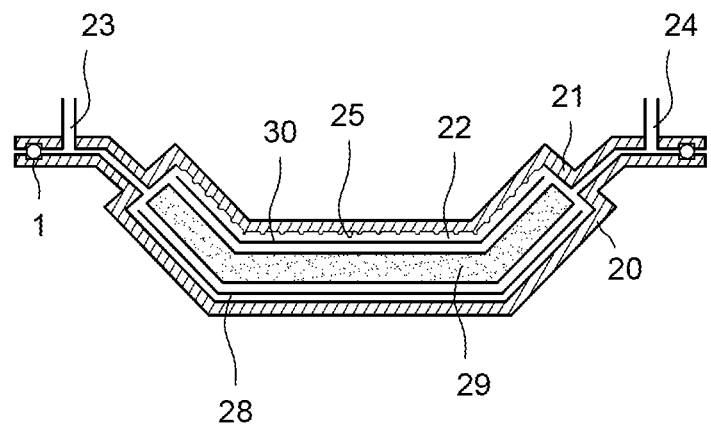
FIG. 3 is an equivalent view of the present invention.

FIG. 3 is a similar view showing a method according to the present invention. The mould this time includes a lower rigid mould tool 20 and an upper rigid mould tool 21 which together define the mould cavity 22. The mould cavity 22 is supplied with resin along resin inlet 23 reservoir using an optional resin pump and a vacuum pump is connected to a vacuum outlet 24 on the opposite side of mould cavity 22. The manner of the resin supply is similar to that described above in relation to FIG. 1. However, the resin pump, if needed, can be operated at a much lower pressure than in the above described RTM process.

Figure 4:
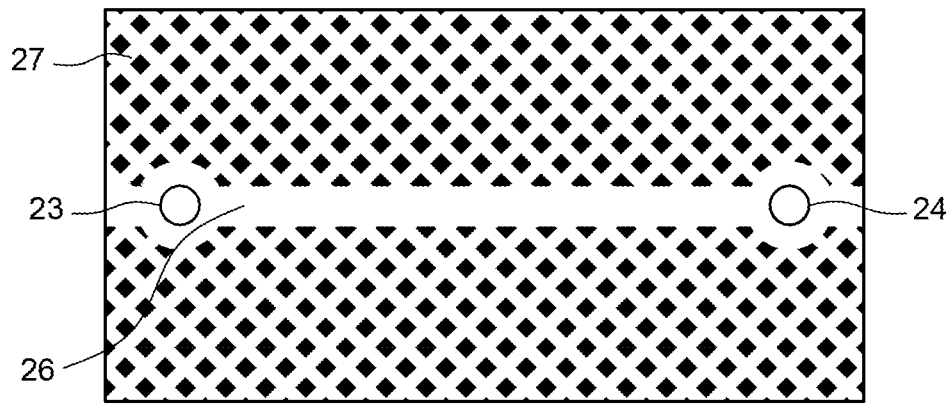
FIG. 4 is a plan view of a mould surface showing a first arrangement of grooves.
Figure 5:
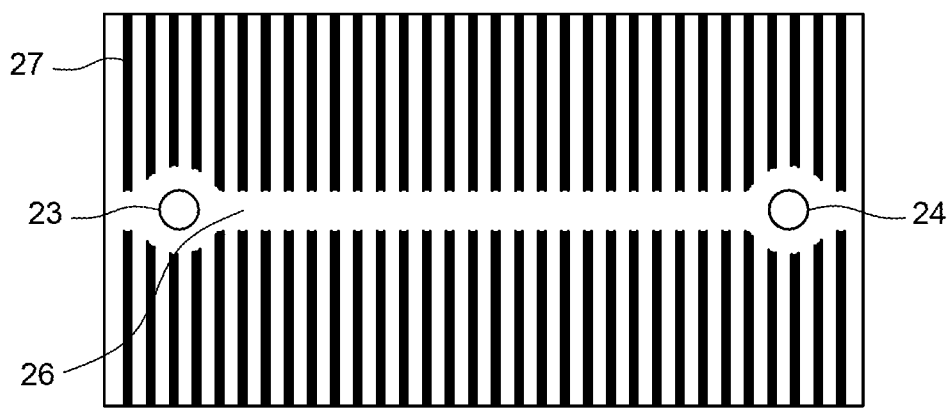
FIG. 5 is a view similar to FIG. 4 showing a second arrangement of grooves.

The mould tools 20, 21 are provided in the surface facing the cavity with an array of grooves 25 which define resin distribution channels. As shown in FIGS. 4 and 5, there may be a primary resin channel 26 from which a plurality of secondary resin channels 27 extend. In FIG. 4 the secondary channels extend at ±45° to the primary channel to create an intersecting grid of secondary channels as shown. In FIG. 5, the secondary channels 27 extend transversely to the primary channel 26. The primary resin channel 26 (of which there may be more than one, may provide a main path from one side of the mould to the other thereby allowing the secondary resin channels to be supplied more easily and with lower flow resistance than would be required if only the secondary channels were present.

In the moulding process, a first peel-ply layer 28 is placed into the mould cavity 22. If grooves are present in the lower mould tool 20 these will be covered by the first peel-ply layer. The reinforcing fibres 29 are then laid up. Because of the reduced flow resistance caused by the grooves, these fibres can be of a higher density than with the prior art. A second peel-ply layer 30 covering the grooves 25 in the upper mould tool is then put in place and the mould tools are closed. Resin is then injected into the mould cavity as previously described and the resin and fibres are cured together.

After curing, the mould is opened and the article removed. The two peel-ply layers 28 and 30 are then removed.

Should it be acceptable to have a pattern of ridges formed by the grooves 25 on one surface of the article, the peel-ply layer may only be necessary on one side of the mould cavity.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of molding a composite article using a mold, comprising:
   laying up fibers in a mold cavity, wherein the mold cavity is defined by a first rigid mold part and a second rigid mold part, at least one of the first or second rigid mold parts having an arrangement of grooves on a surface facing the mold cavity solely for distributing resin across the mold cavity;
   injecting resin from a reservoir into the mold cavity to form a resin article, wherein the reservoir is connected to an inlet into the mold cavity, by running a suction pump to fill the mold cavity with the resin, wherein the suction pump is connected to a port on an opposite side of the mold cavity from the inlet;
   curing the resin article to form a molded article;
   opening the mold; and
   removing the molded article from the mold, wherein both mold parts are provided with a respective arrangement of grooves.

2. A method according to claim 1, further comprising the step of placing a peel-ply layer between the fibers and the grooves on the adjacent mold surface and, after removing the molded article peeling the peel-ply layer to remove a layer of resin formed in the grooves.

3. A method according to claim 2, wherein there is a peel-ply layer associated with each respective mold surface.

4. A method according to claim 1, wherein the arrangement of grooves comprises a number of primary grooves which extend in a direction generally away from the resin inlet towards the opposite side and a number of smaller secondary grooves which distribute the resin from the primary grooves.

5. A method according to claim 1, wherein there is a maximum pressure drop of less than 1 bar (100 kPa) between the mold cavity and the external pressure.

6. A method according to claim 4, wherein the secondary grooves extend transversely to the primary grooves.

7. A method according to claim 4, wherein the secondary grooves extend at an angle of 45 degrees and 135 degrees relative to the primary grooves.

8. A method according to claim 4, wherein each of the primary grooves has a width which is greater than a width of each of the secondary grooves.

\* \* \* \* \*